(12) United States Patent
Martinez et al.

(10) Patent No.: US 12,399,774 B2
(45) Date of Patent: Aug. 26, 2025

(54) METHOD FOR MANAGING THE CONSUMPTION OF A MEMORY DEVICE WHEN USING AN ERROR-CORRECTION CODE AND CORRESPONDING SYSTEM

(71) Applicant: STMicroelectronics (Rousset) SAS, Rousset (FR)

(72) Inventors: Laura Martinez, Rougiers (FR); Jerome Lacan, Trets (FR)

(73) Assignee: STMICROELECTRONICS (ROUSSET) SAS, Rousset (FR)

( * ) Notice: Subject to any disclaimer, the term of this patent is extended or adjusted under 35 U.S.C. 154(b) by 0 days.

(21) Appl. No.: 18/240,988

(22) Filed: Aug. 31, 2023

(65) Prior Publication Data

US 2024/0103965 A1 Mar. 28, 2024

(30) Foreign Application Priority Data

Sep. 22, 2022 (FR) ...................................... 2209591

(51) Int. Cl.
*G06F 11/10* (2006.01)
(52) U.S. Cl.
CPC .............................. *G06F 11/1008* (2013.01)
(58) Field of Classification Search
CPC ............. G06F 11/1008; G06F 12/0284; G06F 13/1684; G06F 2212/1024; G06F 2212/1044; G06F 2212/403; G06F 11/1048
USPC ....................................................... 714/773
See application file for complete search history.

(56) References Cited

U.S. PATENT DOCUMENTS

| | | |
|---|---|---|
| 5,862,154 A | 1/1999 | Pawlowski |
| 7,212,456 B2 | 5/2007 | Callaway et al. |
| 9,460,816 B2 | 10/2016 | Youn et al. |
| 10,275,306 B1 | 4/2019 | MacLaren et al. |
| 10,929,033 B2 | 2/2021 | Meeker et al. |
| 11,189,360 B2 | 11/2021 | Gril-Maffre et al. |
| 11,748,194 B2 * | 9/2023 | Lu ....................... G06F 11/1068 714/764 |
| 2006/0059298 A1 | 3/2006 | Cho et al. |

(Continued)

FOREIGN PATENT DOCUMENTS

FR 3089317 A1 6/2020
KR 101512927 B1 4/2015

OTHER PUBLICATIONS

Wei, Xiaohui, et al., "LAD-ECC: Energy-Efficient ECC Mechanism for GPGPUs Register File," Mar. 9, 2020, Design, Automation & Test in Europe Conference & Exhibition, EDAA, 6 pages.

*Primary Examiner* — James C Kerveros
(74) *Attorney, Agent, or Firm* — Slater Matsil, LLP

(57) ABSTRACT

A method for managing the consumption of a memory device includes performing a first reading of data in a first portion of a first memory area of the memory device. During a same memory access, error correction code check bits are read from a second portion of a second memory area of the memory device. The error correction check bits include error correction check bits that are associated with the data in the first portion of the first memory area and other error correction code check bits associated with other data. All of the other error correction code check bits are stored in a register, and the other data in the first portion of the first memory area is read. The error correction code bits associated with the other data are extracted from the register.

18 Claims, 6 Drawing Sheets

(56) References Cited

U.S. PATENT DOCUMENTS

| | | |
|---|---|---|
| 2010/0211820 A1 | 8/2010 | Kim et al. |
| 2010/0313100 A1 | 12/2010 | Hicken et al. |
| 2011/0047439 A1* | 2/2011 | Jorda ................. G06F 11/1048 |
| | | 714/763 |
| 2013/0039129 A1 | 2/2013 | Radke et al. |
| 2013/0159815 A1* | 6/2013 | Jung ....................... G06F 12/00 |
| | | 714/763 |
| 2017/0187397 A1* | 6/2017 | Kim ................. H03M 13/2948 |
| 2017/0308433 A1* | 10/2017 | Kwon ..................... G11C 29/52 |
| 2019/0050345 A1 | 2/2019 | Satoyama et al. |
| 2022/0093202 A1 | 3/2022 | Wadhawan et al. |

* cited by examiner

```
HADDR         b17              b2b1b0   Add-mem-cut
20000000  ⇒  ..00' '0000' '0000' '0000' '0000'  ⇒  0000   ←  start address  sram1
2000FFFC  ⇒  ..00' '1111' '1111' '1111' '1100'  ⇒  3FFF   ←  end address sram1

20010000  ⇒  ..01' '0000' '0000' '0000' '0000'  ⇒  4000   ←  start address  sram2
2001FFFC  ⇒  ..01' '1111' '1111' '1111' '1100'  ⇒  7FFF   ←  end address sram2

20020000  ⇒  ..10' '0000' '0000' '0000' '0000'  ⇒  8000   ←  start address  sram3
2002FFFC  ⇒  ..10' '1111' '1111' '1111' '1100'  ⇒  BFFF   ←  end address sram3

20030000  ⇒  ..11' '0000' '0000' '0000' '0000'  ⇒  C000   ←  start address  sram4
2003FFFC  ⇒  ..11' '1111' '1111' '1111' '1100'  ⇒  FFFF   ←  end address sram4
```

Fig. 4

| Add-mem-cut | | b15             b2b1b0 | | A-ecc |
|---|---|---|---|---|
| 0000 | ⇒ | '0000' '0000' '0000' '0000' | ⇒ | 0000 |
| 3FFF | ⇒ | '0011' '1111' '1111' '1111' | ⇒ | 0FFF |
| 4000 | ⇒ | '0100' '0000' '0000' '0000' | ⇒ | 1000 |
| 7FFF | ⇒ | '0111' '1111' '1111' '1111' | ⇒ | 1FFF |
| 8000 | ⇒ | '1000' '0000' '0000' '0000' | ⇒ | 2000 |
| BFFF | ⇒ | '1011' '1111' '1111' '1111' | ⇒ | 2FFF |
| C000 | ⇒ | '1100' '0000' '0000' '0000' | ⇒ | 3000 |
| FFFF | ⇒ | '1111' '1111' '1111' '1111' | ⇒ | 3FFF |

Fig. 5

If b1 b0 = '00' ⇒ M-ecc = '00000000000000000000000011111111' ⇒ 1st byte selected for S If b1 b0 = '01' ⇒ M-ecc = '00000000000000001111111100000000' ⇒ 2nd byte selected for S If b1 b0 = '10' ⇒ M-ecc = '00000000111111110000000000000000' ⇒ 3rd byte selected for S If b1 b0 = '11' ⇒ M-ecc = '11111111000000000000000000000000' ⇒ 4th byte selected for S

METHOD FOR MANAGING THE CONSUMPTION OF A MEMORY DEVICE WHEN USING AN ERROR-CORRECTION CODE AND CORRESPONDING SYSTEM

CROSS-REFERENCE TO RELATED APPLICATIONS

This application claims priority to French Application No. 2209591, filed on Sep. 22, 2022, which application is hereby incorporated herein by reference.

TECHNICAL FIELD

The present disclosure generally relates to methods and systems for managing the consumption of a memory device during the use of an Error Correction Code (ECC) in the memory device.

BACKGROUND

An error correction code is well known to the person skilled in the art and makes it possible to correct the erroneous logic value of a bit. More specifically, with an error correction code, ifs check bits are added to b data bits it is possible to correct r errors from the b+s bits.

When it is desired to implement an error correction code, the size of the memory containing the data and the check bits is larger than the size of a memory intended to store data without using an error correction code.

By way of indication, a static random access memory intended to store data on a width of 32 bits (32-bit words) has an additional width of 7 bits for storing check bits, which leads to an overall width of 39 bits, so as to be able to store 39-bit words.

The result of this is an increase of 22% of the surface area of a memory having stored check bits in relation to a 32-bit memory not intended to store check bits.

If a user does not want to use an error correction code in a particular application, this additional memory area of 22% will never be used because it is not accessible for data storage. Yet, this lost memory surface area has a direct impact in leakage currents, which is non-negligible for low-consumption products.

The addition of memory surface area also has an impact on the cost of the device.

It has been proposed in French patent application under no. 3089317 to use a memory structure offering a greater flexibility in the management of the memory space of a memory so as to take into account the optional nature of the use of an error correction code.

Thus, in this aforementioned patent application, it has been proposed a memory capable of storing data and error correction code check bits and of optionally being able to reuse the memory space intended for these check bits, for data storage purposes if in certain applications, it is not intended to use an error correction code.

More specifically, it has been proposed a system comprising a memory device including a first memory region intended to store first data at first addresses and a second memory region intended to store, on command, either second data at second addresses, or error correction code check bits associated with the first data at third addresses.

This system is based on an organization of memory regions in rows and on a storage in particular of data bits and check bits (when it is intended to use an error correction code) in these rows with a specific addressing.

However, when it is intended to use an error correction code in such a system, for each memory access of data in the first memory region, a memory access in the second memory region may also be utilized, which doubles the consumption.

SUMMARY

The present disclosure generally relates to methods and systems for managing the consumption of a memory device during the use of an Error Correction Code (ECC) in the memory device, which in some embodiments may be a volatile memory device, for example a Static Random Access Memory (SRAM) device.

The inventors of the present disclosure have recognized a need or desire to reduce the consumption in a memory system using error correction codes.

In accordance with at least one embodiment, the present disclosure provides a system that includes a memory device, a register, and processing circuitry. The memory device includes a first memory region having a first portion of a first memory area configured to store data, and a second memory region having a second portion of a second memory area configured to store error correction code check bits associated with the data. The processing circuitry is configured to: perform a first reading of the data in the first portion of the first memory area; read, during a same memory access, the error correction code check bits associated with the data and other error correction code check bits associated with other data stored in the second portion of the second memory area; store the other error correction code check bits in the register; read the other data in the first portion of the first memory area; and extract from the register the error correction code check bits associated with the other data.

In at least one embodiment, the present disclosure provides a method that includes: performing a first reading of data in a first portion of a first memory area of a memory device; reading, during a same memory access, error correction code check bits associated with the data and other error correction code check bits associated with other data stored in a second portion of a second memory area of the memory device; storing, in a register, all of the other error correction code check bits; reading the other data in the first portion of the first memory area; and extracting from the register the error correction code check bits associated with the other data.

In at least one embodiment, the present disclosure provides a method that includes: storing a first row of data in a first memory region of a memory device; storing a second row of data in the first memory region; storing error correction check bits associated with the first and second rows of data in a row of a second memory region of the memory device; accessing, by processing circuitry, the first row of data stored in the first memory region and the error correction check bits associated with the first row of data; and storing, in a register, the error correction code check bits associated with the second row of data stored in the first memory region.

BRIEF DESCRIPTION OF THE DRAWINGS

For a more complete understanding of one or more embodiments of the present disclosure, and the advantages thereof, reference is now made to the following descriptions taken in conjunction with the accompanying drawings, in which:

FIG. 4 is a diagram illustrating another example of obtaining of addresses associated with data intended to be stored in the memory areas of a memory device or system, in accordance with one or more embodiments;

FIG. 5 is a diagram illustrating another example of obtaining of addresses associated with data intended to be stored in the memory areas of a memory device or system, in accordance with one or more embodiments;

DETAILED DESCRIPTION OF ILLUSTRATIVE EMBODIMENTS

Figure 1:
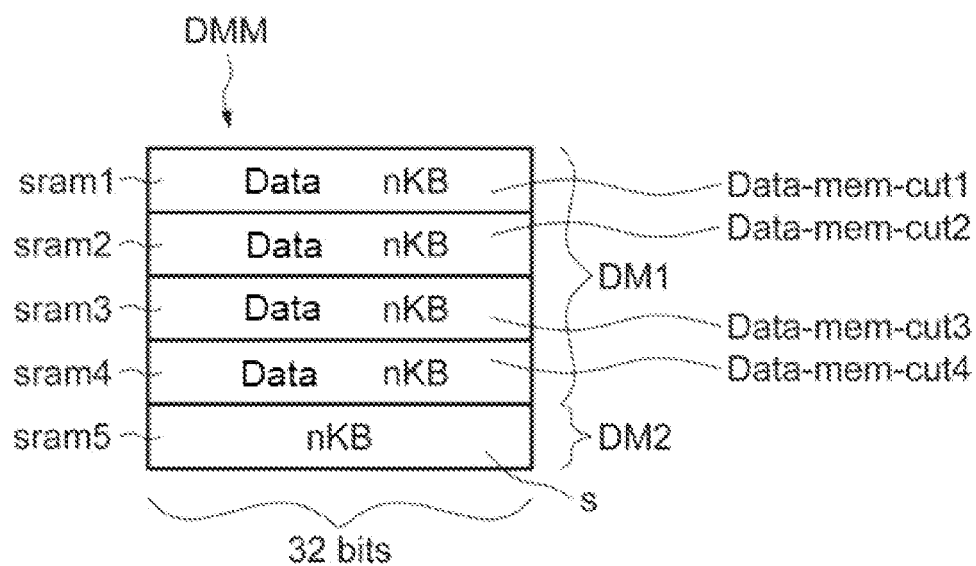
FIG. 1 is block diagram illustrating a memory device, in accordance with one or more embodiments of the present disclosure.

It will now be described embodiments and implementations compatible with a memory system, such as the system structure of the type of that described in French patent application no. 3089317 to which the person skilled in the art may refer.

Although a preferred mode of one or more embodiments of the disclosure applies particularly to the system described in the aforementioned French patent application no. 3089317, it is proposed according to a more general aspect, a system comprising
  a memory device, for example a volatile memory device including a first memory region including at least one first portion of at least one first memory area, and optionally a plurality of memory areas, intended to store data and a second memory region including at least one second portion of a second memory area intended to store error correction code check bits associated with the data,
  a register, and
  processing circuitry.

According to this general aspect, the processing circuitry is configured to
  during a first reading of data in the first portion of the first memory area, read during the same memory access, the error correction code check bits associated with this data as well as all the other error correction code check bits stored in the second portion of the second memory area and store in the register all these other error correction code check bits, and
  during a subsequent reading of another data in the first portion of the first memory area, extract from the register the error correction code check bits associated with this other data.

Thus, only a single memory access is performed in the second memory region during the first reading of data in the first memory area, because only this memory access is taken advantage of to extract all of the error correction code check bits stored in this second memory region and to store in the register, the check bits associated with the other data stored in the first memory areas in order to extract them therefrom during subsequent memory accesses to the first memory area.

In addition, an access to a register is less expensive in terms of consumption than an access to a memory.

According to an embodiment particularly adapted to a system of the type of that described in the aforementioned French patent application no. 3089317,
  said at least one first memory area and the second memory area include rows,
  each row of said at least one first memory area and each row of the second memory area are configured to store words of p bytes,
  the check bits associated with the data stored in p successive rows of said at least one first memory area are stored in the p bytes of a row of the second memory area.

Moreover the processing circuitry is configured to
  during said first reading of data stored in a row of the first memory area, read during the same memory access, the byte containing the error correction code check bits associated with this data and stored in the corresponding row of the second memory area as well as p-1 other bytes stored in said corresponding row of the second memory area and store these p-1 other bytes in the register, and
  during said subsequent reading of another data in another row of the first memory area, extract from the register the byte containing the error correction code check bits associated with this other data.

According to another aspect, it is proposed a method for managing the consumption of a system, the system comprising a memory device including a first memory region including at least one first portion of at least one first memory area storing data, a second memory region including at least one second portion of a second memory area storing error correction code check bits associated with the data, and a register, the method comprising during a first reading of data in the first portion of the first memory area, reading during the same memory access, the error correction code check bits associated with this data as well as all of the other error correction code check bits stored in the second portion of the second memory area and storing in the register all of the other error correction code check bits, and during a subsequent reading of another data in the first portion of the first memory area, extracting from the register the error correction code check bits associated with this other data.

According to one implementation wherein, said at least one first memory area and the second memory area include rows, each row of said at least one first memory area and each row of the second memory area storing words of p bytes, the check bits associated with the data stored in p successive rows of said at least one first memory area being stored in the p bytes of a row of the second memory area, the method comprises during said first reading of data stored in a row of the first memory area, reading during the same memory access the byte containing the error correction code check bits associated with this data and stored in the corresponding row of the second memory area as well as p-1 other bytes stored in said corresponding row of the second memory area and storing in the register these p-1 other bytes, and during said subsequent reading of another data in another row of the first memory area, extracting the byte containing the error correction code check bits associated with this other data.

The memory device may be a volatile memory device, for example a static random access memory (SRAM) but also a non-volatile memory for example an electrically erasable programmable read-only memory (EEPROM), however embodiments of the present disclosure are not limited thereto.

FIG. 1 illustrates a memory device in accordance with one or more embodiments of the present disclosure. In FIG. 1, the reference DMM designates the memory device, here a volatile memory device, including a first memory region DM1 and a second memory region DM2.

The first memory region DM1 includes four first memory areas sram1, sram2, sram3 and sram4 of identical memory size.

In the example illustrated here, these first memory areas are formed by separate static random access memories. However, in at least some embodiments, the memory areas may be memory areas of the same memory.

The second memory region DM2 includes a second memory area sram5, of memory size identical to that of the memory areas sram1-sram4.

Here again, the memory area sram5 is a static random access memory, however embodiments of the present disclosure are not limited thereto.

Each memory area includes rows.

In the example described here, the width of the memory device is equal to 32 bits, that is to say it is possible to store 32-bit data words each including four bytes.

The memory size is equal to n kbits, for example 64 kbits.

The memory areas sram1-sram4 are intended to respectively store data Data-mem-cut1-4.

The memory area sram5 is intended to include the error correction code check bits associated with the data stored in the memory areas sram1-sram4.

Figures 2, 3:
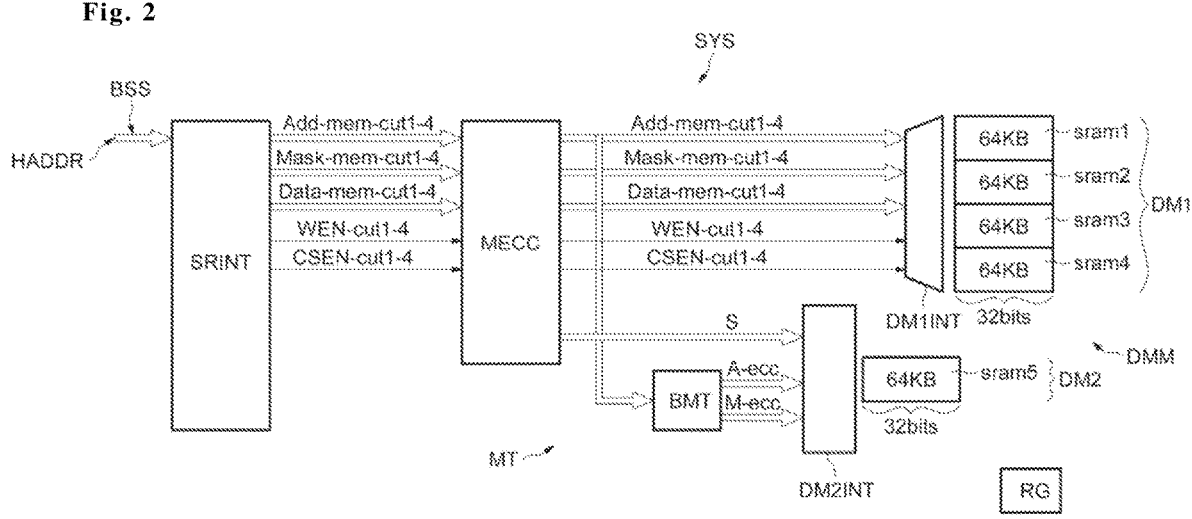
FIG. 2 is a block diagram illustrating a memory system, in accordance with one or more embodiments.
FIG. 3 is diagram illustrating an example of obtaining of addresses associated with data intended to be stored in the memory areas of a memory device or system, in accordance with one or more embodiments.

The system SYS includes as illustrated in FIG. 2, a register RG and processing circuitry MT including an interface SRINT connected to a bus BSS that may be of any conventional structure and for example a bus AHB using a protocol described for example in the document AMBA 3 AHB-Lite Protocol V1.0 Specification, from ARM (2001, 2006). The processing circuitry MT may include any suitable circuitry configured to perform the various operations described herein with respect to the processing circuitry MT, and in some embodiments, the processing circuitry MT may be or include a microprocessor including a general processor with instructions stored in a memory that when executed by the processor cause the processor to perform these functions.

This bus particularly conveys the data Data-mem-cut1-4, initial addresses HADRR associated with the data, as well as other conventional bus signals not shown here for the sake of simplicity.

The interface SRINT, of conventional structure and known per se, is configured to deliver addresses associated with the data Data-mem-cut1-4.

These addresses are drawn from the initial addresses HADRR that were conveyed on the bus BSS.

The addresses could be identical to the initial addresses. However, depending on the architecture of the system, and particularly on the width of the memory areas, the addresses may be obtained from initial addresses by truncating one or more bits.

In the example described here, it is possible to write in each row of a memory area srami, i equal to 1, 2, 3, or 4, a 32-bit word consisting of 4 bytes of 8 bits.

Thus, in this example, the references Add-mem-cut1-4 designate the addresses of a row of the memory areas sram1-4 and the reference Mask-mem-cut1-4 designates the number of the byte in the designated row of the memory area considered.

Thus, the addresses Add-mem-cut1-4 and the masks Mask-mem-cut1-4 form said addresses for storing data.

The signals WEN-cut-1-4 are conventional command signals for writing in the various memory areas and the signals CSEN-cut1-4 are conventional signals for selecting the memory area considered.

The processing circuitry MT, in some embodiments, may also include error control circuitry MECC (which may be referred to herein as an error correction code module MECC), which may include any suitable circuitry and in some embodiments may be of conventional structure and known per se, configured to determine the check bits associated with said data Data-mem-cut1-4.

More specifically, for a four-byte word stored in a row of a memory area sram1-4, the reference S designates the s check bits associated with this 4-byte word.

S is, in the case of a 32-bit word, a 7-bit word. Consequently, S may be stored in a byte of the memory area sram5.

If the width of the memory was of 64 bits and not of 32 bits, S would have a length of 8 bits, which could still be stored in one byte of the memory sram5.

As is conventional, to write a new 32-bit word in a row of one of the memory areas sram1 to sram4, firstly the reading of the word already stored in this row is carried out.

Then, the error correction code module MECC determines a syndrome on the basis of the data bits and from the set S of check bits.

It is reminded here that a syndrome is the result of intermediate calculations performed during the error correction making it possible to detect and to locate the error.

If a bit is defective, the block MECC effectively detects this defective bit and carries out its correction.

Before writing the new word to the address of the previous word in the corresponding memory area, the block MECC calculates the new set S of new check bits corresponding to the new bytes of data. In this respect, the new set S of check bits is calculated with, if applicable, the corrected value of the defective bit.

Then, the new word is written in the corresponding memory area at the corresponding first address.

As for the new set S of check bits, it is, as illustrated in FIG. 2, delivered to a memory interface DM2INT of the second memory region DM2.

The processing circuitry also may include a processing block BMT configured to determine addresses for storing these check bits S.

These check bits S will indeed be stored in the memory area sram5.

Such an address includes here the address A-ecc of a row of the memory area sram5 as well as a mask M-ecc making it possible to select in said row, one of the 4 bytes.

As will be seen in more detail below, these addresses are determined on the basis of the addresses of rows Add-mem-cut1-4.

The addresses A-ecc, M-ecc are also delivered to the interface DM2INT.

The signals WEN-cut1-4 and CSEN-cut1-4 are delivered to the interface DM1INT coupled to the first memory region DM1.

FIG. 3 more particularly illustrates the obtaining of addresses associated with the data intended to be stored in the memory areas sram1-sram4 on the basis of the initial addresses HADRR received by the memory interface SRINT.

In the example described here, the initial addresses HADDR are addresses coded on 18 bits b0-b17.

The left-hand part of FIG. 3 illustrates these addresses in hexadecimal format.

The addresses Add-mem-cut are obtained by truncating the two least significant bits b0, b1 of the initial addresses.

Thus, the right-hand part of FIG. 3 illustrates these addresses Add-mem-cut in hexadecimal format.

More specifically, the value 0000 is the start address of the area srami whereas the address 3FFF is the end address of this memory area sram1.

The address 4000 is the start address of the memory area sram2 whereas the address 7FFF is the end address of this memory area sram2.

The address 8000 is the start address of the memory area sram3 whereas the address BFFF is the end address of this memory area sram3.

Finally, the address C000 is the start address of the memory area sram4 whereas the address FFFF is the end address of the memory area sram4.

FIG. 4 illustrates an example of obtaining addresses A-ecc on the basis of the first addresses Add-mem-cut.

More specifically, here again, a truncation by two bits of the addresses Add-mem-cut is performed in order to obtain the address A-ecc of the corresponding row in the memory area sram5.

More specifically, this truncation is a truncation of the two least significant bits b0-b1 of the address Add-mem-cut.

Thus, the check bits S associated with the data stored in the memory area srami will be written between the addresses 0000 and 0FFF of the memory area sram5.

The check bits associated with the data written in the memory area sram2 will be stored between the addresses 1000 and 1FFF of the memory area sram5.

The check bits associated with the data written in the memory area sram3 will be stored between the addresses 2000 and 2FFF of the memory area sram5.

Finally, the check bits associated with the data written in the memory area sram4 will be stored between the addresses 3000 and 3FFF of the memory area sram5.

Finally, as illustrated in FIG. 5, the mask M-ecc depends on the value of the two least significant bits b1, b0 of the address Add-mem-cut.

More specifically, if these two bits b1, b0 are equal to 0, then the first byte of M-ecc is equal to 1, the other bits being equal to 0, which means that, to store the check bits S, the first byte of the corresponding row is selected.

If the two bits b1, b0 have respectively values 0 and 1, then this time it is the second byte of the mask M-ecc that has the value 1, which means that the second byte of the row is selected to store the check bits S.

If the bits b1, b0 have respectively values of 1 and 0, then this time it is the third byte of the M-ecc that has the value 1, which corresponds to a selection of the third byte of the corresponding row to store the check bits S.

Finally, if the two bits b1 and b0 both have the value 1, then it is the fourth byte of M-ecc that has the value 1, which corresponds to a selection of the fourth byte of the corresponding row to store the check bits.

Of course, this manner of determining M-ecc also applies for determining Mask-mem-cut1-4 so as to select for each byte a data word to be stored, the corresponding byte in the row addressed.

Thus, for example if it is desired to store a data byte at the initial address HADDR equal to 0x2001ABC8, the address will be equal, after truncating the initial address, to 6AF2, which corresponds to a first address Add-mem-cut2 of a row of the second memory area sram2.

As for the 7-bit word forming the S word of the check bits associated with the new 32-bit word stored in the row, the address A-ecc of the corresponding row in the memory area sram5, after truncating the address Add-mem-cut2, has the value 1ABC.

The mask M-ecc associated with this row address indicates, since the two least significant bits b1, b0 of the first address have respectively values 1 and 0, a selection of the third byte of this row to store this check word S.

Figure 6:
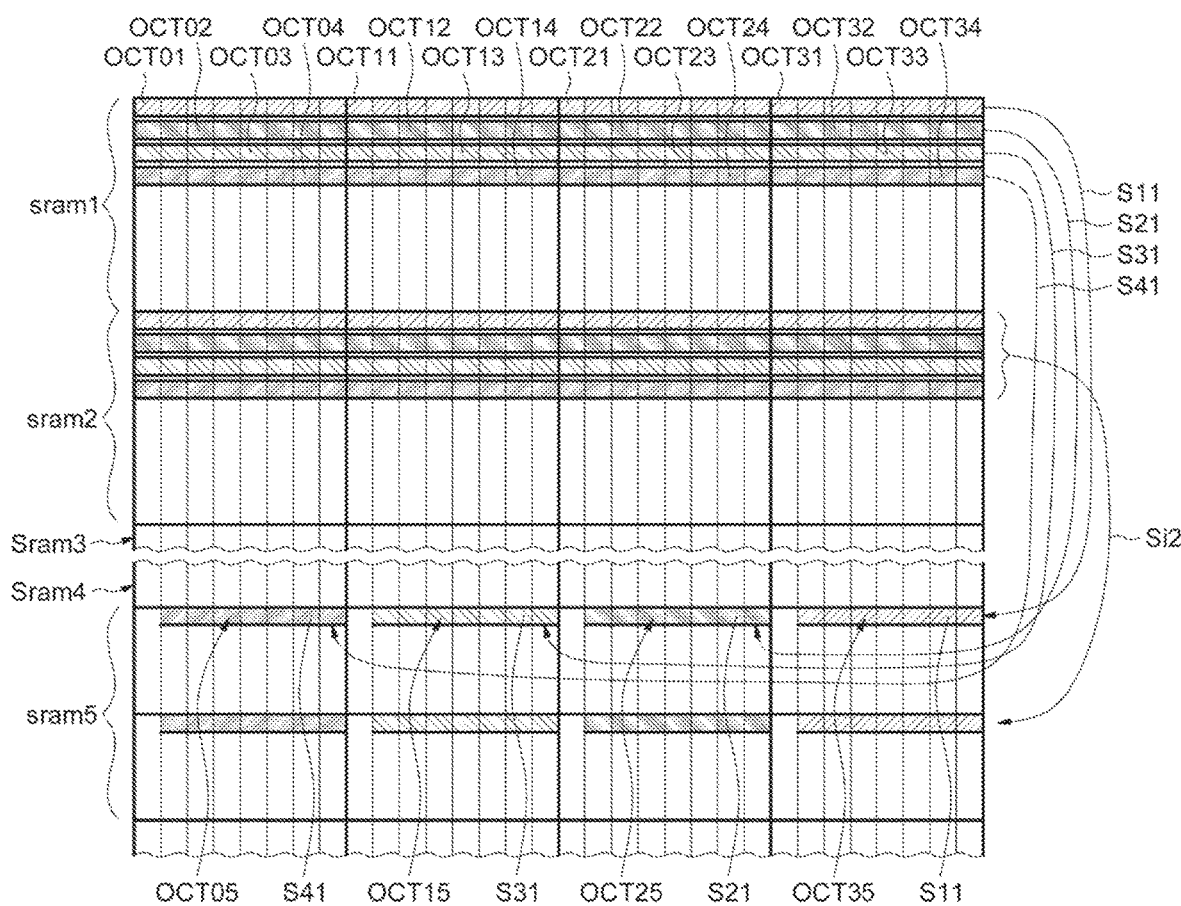
FIG. 6 is a diagram illustrating memory areas of a memory device, in accordance with one or more embodiments.

In the example illustrated in FIG. 6, it is assumed that all of the memory areas sram1 to sram2 and sram5 have a memory size of 64 kbits with a 32-bit word width.

Consequently, each memory area includes 2048 rows, each row being able to contain a 32-bit word (4 bytes).

A group of 4 rows of the memory area srami represents a first portion of this memory area sram1

A row of the memory area sram5 represents a second portion of this memory area.

The error correction code is applied. Each check word associated with a 32-bit data word contains 7 check bits.

By applying the aforementioned rules for determining the addresses and masks, it can be seen that the set Sit of check bits associated with the four bytes OCT01, OCT11, OCT21 and OCT31 of the data of the first row of the memory area sram1 will be stored in the byte OCT35 of the first row of the memory area sram5.

Likewise, the check bit word S21 associated with the four bytes OCT02, OCT12, OCT22 and OCT32 of the data of the second row of the memory area sram1, will be stored in the byte OCT25 of the first row of the memory sram5.

The check bit word S31 associated with the four bytes OCT03, OCT13, OCT23 and OCT33 of the data of the third row of the memory sram1 will be stored in the byte OCT15 of the first row of the memory sram5.

Finally, the check bit word S41 associated with the four bytes OCT04, OCT14, OCT24 and OCT34 of the data of the fourth row of the memory area sram1 will be stored in the byte OCT05 of the first row of the memory area sram5.

In addition, this process for storing the various check bit words associated with the various rows will continue.

Generally, the four check bit words associated with the four consecutive rows of a memory area srami, i varying between 1 and 4, will be stored in one and the same row of the memory area sram5.

Therefore, the check words associated with the 2048 rows of the memory area sram1 will be stored in 512 rows of the memory sram5.

In addition, the 512 following rows of the memory sram5 will be dedicated to storing the check bit words Si2 associated with the data stored in the memory area sram2.

Figure 7:
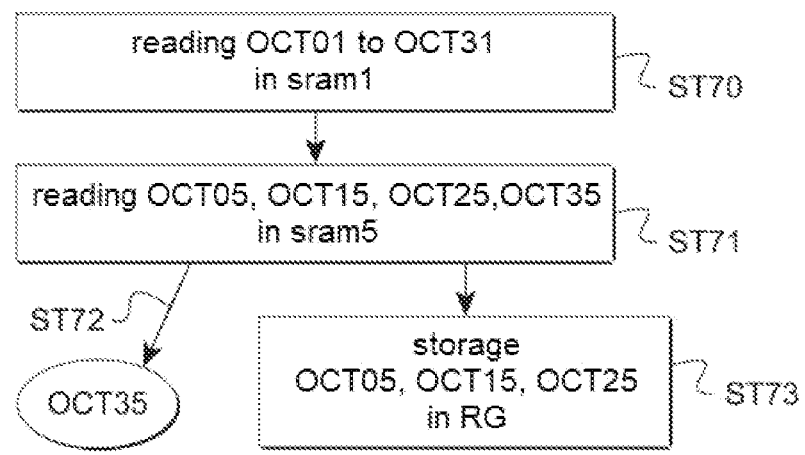
FIG. 7 is a flowchart illustrating a process for managing the consumption of a memory device during the use of error correction code words, in accordance with one or more embodiments.
Figure 8:
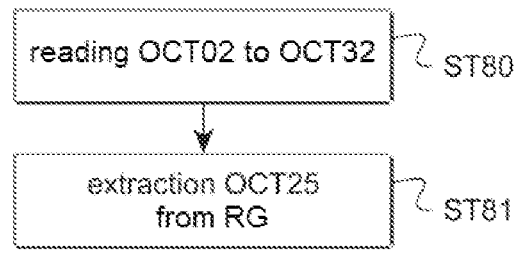
FIG. 8 is a flowchart illustrating further details of the process for managing the consumption of a memory device during the use of error correction code words, in accordance with one or more embodiments.

Reference is now made more particularly to FIGS. 7 and 8 to describe one implementation for managing the consumption during the use of error correction code words.

It is assumed in step ST70 that the processing circuitry MT activates the conventional structure reading circuitry so as to perform a first reading in the memory area sram1 of the data materialized by the four bytes OCT01 to OCT31 (see FIG. 6).

The processing circuitry MT then activates in step ST71 the reading circuitry, so as to perform during the same memory access a reading of the entire first row of the memory area sram5 and extract therefrom the bytes OCT05, OCT15, OCT25 and OCT35.

The byte OCT35, representing the error correction word associated with the data materialized by the four bytes OCT01 to OCT31 is delivered (step ST72) whereas the other error correction code bytes OCT05, OCT15 and OCT25 are stored in the register RG (step ST73).

As shown in FIG. 8, during a subsequent sequential reading of the bytes OCT02 to OCT32 representing another data of the group of the four first rows of the memory area sram1 (step ST80), the processing circuitry MT extracts from the register RG the error correction code byte OCT25 associated with this other data (ST81).

What is claimed is:

1. A system, comprising:
  a memory device including a first memory region having a first portion of a first memory area configured to store data, and a second memory region having a second portion of a second memory area configured to store error correction code check bits associated with the data, wherein the first memory area and the second memory area include rows, wherein each row of the first memory area and each row of the second memory area is configured to store words of p bytes, and the error correction code check bits associated with the data stored in p successive rows of the first memory area are stored in the p bytes of a row of the second memory area;
  a register; and
  processing circuitry configured to:
    perform a first reading of a first portion of the data in the first portion of the first memory area;
    read, in the second portion of the second memory area during a same memory access, a first portion of the error correction code check bits associated with the first portion of the data and a second portion of the error correction code check bits associated with a second portion of the data;
    store the second portion of the error correction code check bits in the register;
    read the second portion of the data in the first portion of the first memory area; and
    extract from the register the second portion of the error correction code check bits associated with the second portion of the data.

2. The system according to claim 1, wherein the processing circuitry is configured to read the first portion of the error correction code check bits associated with the first portion of the data and the second portion of the error correction code check bits associated with the second portion of the data during the performing the first reading of the data.

3. The system according to claim 1, wherein the processing circuitry is configured to:
  read, during the first reading of the data, first data stored in a first row of the first memory area;
  read, in a first row of the second memory area during the same memory access, a byte containing error correction code check bits associated with the first data and p-1 bytes containing error correction code check bits associated with data stored in p-1 rows of the first memory area;
  store in the register the p-1 bytes;
  read, during the reading the data stored in the p-1 rows of the first memory area, second data in a second row of the first memory area; and
  extract from the register a byte among the p-1 bytes containing error correction code check bits associated with the second data.

4. The system according to claim 1, wherein the memory device is a volatile memory device.

5. The system according to claim 4, wherein the memory device is a static random access memory (SRAM) device.

6. The system according to claim 1, wherein the memory device is a non-volatile memory device.

7. The system according to claim 6, wherein the memory device is an electrically erasable programmable read-only memory (EEPROM) device.

8. A method, comprising:
  performing a first reading of a first portion of data in a first portion of a first memory area of a memory device;
  reading, in a second portion of a second memory area of the memory device during a same memory access, error correction code check bits associated with the first portion of the data and error correction code check bits associated with a second portion of the data;
  storing, in a register, the error correction code check bits associated with the second portion of the data;
  reading the second portion of the data in the first portion of the first memory area; and
  extracting from the register the error correction code check bits associated with the second portion of the data, wherein the first memory area and the second memory area include rows, each row of the first memory area and each row of the second memory area stores words of p bytes, and the error correction code check bits associated with the data stored in p successive rows of the first memory area are stored in the p bytes of a row of the second memory area.

9. The method of claim 8, comprising:
  reading, during the first reading of the data, first data stored in a first row of the first memory area;
  reading, in a first row of the second memory area during the same memory access, a byte containing error correction code check bits associated with the first data and p-1 bytes containing error correction code check bits associated with data stored in p-1 rows of the first memory area;
  storing in the register the p-1 bytes;
  read, during the reading the data stored in the p-1 rows of the first memory area, second data in a second row of the first memory area; and
  extracting from the register a byte among the p-1 bytes containing error correction code check bits associated with the second data.

10. The method according to claim 8, wherein the memory device is a volatile memory device.

11. The method according to claim 8, wherein the memory device is a non-volatile memory device.

12. A method, comprising:
  storing a first row of data in a first memory region of a memory device, wherein the first row of data comprises first words of p bytes;
  storing a second row of data in the first memory region, wherein the second row of data comprises second words of p bytes;
  storing error correction code check bits associated with the first and second rows of data in a row of a second memory region of the memory device, wherein the error correction code check bits are stored in the p bytes of the row of the second memory region;

accessing, by processing circuitry, the first row of data stored in the first memory region and the error correction code check bits associated with the first and second rows of data; and storing, in a register, the error correction code check bits associated with the second row of data stored in the first memory region.

13. The method according to claim 12, comprising:

storing a third row of data in the first memory region of the memory device;

storing error correction code check bits associated with the third row of data in the row of the second memory region;

accessing, by the processing circuitry, the second row of data stored in the first memory region; and accessing, from the register, the error correction code check bits associated with the second row of data.

14. The method according to claim 13, comprising:

storing, in the register, the error correction code check bits associated with the third row of data.

15. The method according to claim 14, comprising:

storing a fourth row of data in the first memory region of the memory device;

storing error correction code check bits associated with the fourth row of data in the row of the second memory region;

accessing, by the processing circuitry, the third row of data in the first memory region; and accessing, from the register, the error correction code check bits associated with the third row of data.

16. The method according to claim 15, comprising:

storing, in the register, the error correction code check bits associated with the fourth row of data.

17. The method according to claim 16, comprising:

accessing, by the processing circuitry, the fourth row of data in the first memory region; and accessing, from the register, the error correction code check bits associated with the fourth row of data.

18. The method according to claim 12, wherein the memory device comprises a non-volatile memory device.

* * * * *